US011348072B2

(12) United States Patent
Singh et al.

(10) Patent No.: US 11,348,072 B2
(45) Date of Patent: May 31, 2022

(54) TECHNIQUES FOR SHARING ELECTRONIC CALENDARS BETWEEN MAILBOXES IN AN ONLINE APPLICATION AND COLLABORATION SERVICE (71) Applicant: Microsoft Technology Licensing, LLC, Redmond, WA (US)

(72) Inventors: Jaskaran Singh, Redmond, WA (US); Szymon Madejczyk, Sammamish, WA (US); Aaron Eugene Stout, Kirkland, WA (US); Balasubramanian Ramachandran, Redmond, WA (US); Carolyn Amy McKenna, Redmond, WA (US); Julia Foran Schearer, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/410,884

(22) Filed: Jan. 20, 2017

(65) Prior Publication Data
US 2018/0089632 A1    Mar. 29, 2018

Related U.S. Application Data (60) Provisional application No. 62/399,960, filed on Sep. 26, 2016.

(51) Int. Cl.
*G06Q 10/00* (2012.01)
*G06F 16/00* (2019.01)
(Continued)

(52) U.S. Cl.
CPC ......... *G06Q 10/1093* (2013.01); *G06F 16/27* (2019.01); *G06Q 10/107* (2013.01)

(58) Field of Classification Search
CPC .................................................. G06Q 10/1093
See application file for complete search history.

(56) References Cited

U.S. PATENT DOCUMENTS 6,457,062 B1    9/2002    Pivowar et al.
7,174,517 B2    2/2007    Barnett et al.
(Continued)

FOREIGN PATENT DOCUMENTS

WO    2017040226 A1    3/2017

OTHER PUBLICATIONS https://www.youtube.com/watch?v=bkwz3EMJe18 G Suite Youtube Channel, View Coworker's Calendar, 2012, Sep. 4, 2012.*
(Continued)

*Primary Examiner* — Hafiz A Kassim
*Assistant Examiner* — Matheus Ribeiro Stivaletti (57) ABSTRACT The techniques described herein facilitate sharing electronic cloud-based calendars via online application and collaboration services, e.g., Microsoft Office 365®. In an implementation, a method of operating an online application and collaboration service for sharing electronic calendars between mailboxes is disclosed. The method includes receiving a request to share a master calendar owned by a first user of the online application and collaboration service with a second user. The master calendar is stored in the first user's mailbox. The method further includes communicating a response indicating acceptance of the request to share the master calendar, generating a copy of the master calendar in the second user's mailbox, and synching the copy of the master calendar with the master calendar using pre-cached data to populate an initial view.

20 Claims, 7 Drawing Sheets (51) Int. Cl.
   *G06Q 10/10*   (2012.01)
   *G06F 16/27*   (2019.01)

(56) References Cited

U.S. PATENT DOCUMENTS

| | | | |
|---|---|---|---|
| 7,805,676 B2 | 9/2010 | Schemers et al. | |
| 7,991,637 B1 | 8/2011 | Guiheneuf et al. | |
| 8,117,264 B1* | 2/2012 | Lamb | G06Q 10/107 |
| | | | 709/206 |
| 8,407,768 B1* | 3/2013 | Hayter | H04L 63/0853 |
| | | | 726/5 |
| 8,745,616 B1 | 6/2014 | Deacon | |
| 8,805,950 B1 | 8/2014 | Landsman et al. | |
| 8,943,140 B1* | 1/2015 | Kothari | G06Q 10/1095 |
| | | | 709/204 |
| 8,954,092 B2 | 2/2015 | Kirmse et al. | |
| 9,485,640 B2 | 11/2016 | Bowers et al. | |
| 9,614,880 B1 | 4/2017 | Davis et al. | |
| 10,136,315 B2 | 11/2018 | Gong et al. | |
| 10,140,303 B1 | 11/2018 | Patterson | |
| 2002/0091834 A1 | 7/2002 | Isozu et al. | |
| 2005/0262164 A1* | 11/2005 | Guiheneuf | G06Q 10/06311 |
| 2005/0267975 A1* | 12/2005 | Qureshi | H04L 63/105 |
| | | | 709/229 |
| 2007/0233786 A1 | 10/2007 | Rothley | |
| 2007/0244976 A1* | 10/2007 | Carroll | G06Q 10/107 |
| | | | 709/206 |
| 2007/0283279 A1 | 12/2007 | Barnes | |
| 2007/0288614 A1 | 12/2007 | May et al. | |
| 2008/0140498 A1* | 6/2008 | Setty | G06Q 10/1093 |
| | | | 705/7.18 |
| 2008/0195705 A1 | 8/2008 | Lee | |
| 2008/0256537 A1 | 10/2008 | Fachan et al. | |
| 2008/0294490 A1* | 11/2008 | Nuhaan | G06Q 50/24 |
| | | | 705/7.15 |
| 2009/0024952 A1 | 1/2009 | Brush et al. | |
| 2009/0100347 A1 | 4/2009 | Schemers et al. | |
| 2009/0112986 A1* | 4/2009 | Caceres | G06Q 10/109 |
| | | | 709/204 |
| 2009/0125410 A1 | 5/2009 | Perlman | |
| 2009/0157627 A1* | 6/2009 | Arthursson | G06F 9/455 |
| 2009/0254615 A1 | 10/2009 | Baliga et al. | |
| 2010/0057516 A1* | 3/2010 | Goraly | G06Q 10/06314 |
| | | | 705/7.24 |
| 2010/0146115 A1* | 6/2010 | Bezos | H04W 4/21 |
| | | | 709/225 |
| 2010/0162105 A1* | 6/2010 | Beebe | G06Q 10/109 |
| | | | 715/273 |
| 2011/0035460 A1 | 2/2011 | May et al. | |
| 2011/0252351 A1 | 10/2011 | Sikora et al. | |
| 2012/0144407 A1 | 6/2012 | Hacigumus et al. | |
| 2012/0232946 A1 | 9/2012 | Cocanougher et al. | |
| 2013/0067170 A1* | 3/2013 | Lam | G06F 12/08 |
| | | | 711/137 |
| 2013/0218622 A1* | 8/2013 | MacKenzie | G06Q 10/1093 |
| | | | 705/7.19 |
| 2013/0218888 A1 | 8/2013 | Seligmann | |
| 2013/0232213 A1 | 9/2013 | Bustamente | |
| 2014/0035949 A1 | 2/2014 | Singh et al. | |
| 2014/0066013 A1 | 3/2014 | Mascarenhas et al. | |
| 2014/0149886 A1* | 5/2014 | Los | G06F 3/0481 |
| | | | 715/753 |
| 2014/0172944 A1 | 6/2014 | Newton et al. | |
| 2014/0200942 A1* | 7/2014 | Benjamin | G06Q 10/1093 |
| | | | 705/7.18 |
| 2014/0219034 A1 | 8/2014 | Gomez et al. | |
| 2014/0237380 A1 | 8/2014 | Kurrus et al. | |
| 2015/0134737 A1 | 5/2015 | Albrecht | |
| 2015/0347987 A1* | 12/2015 | Ali | G06Q 10/1097 |
| | | | 705/7.21 |
| 2015/0350221 A1* | 12/2015 | Espinosa | G06Q 20/227 |
| | | | 705/44 |
| 2015/0372829 A1 | 12/2015 | Joshi et al. | |
| 2016/0021034 A1 | 1/2016 | Huiban | |
| 2016/0026977 A1* | 1/2016 | Umapathy | G06Q 10/1093 |
| | | | 705/7.18 |
| 2016/0098687 A1* | 4/2016 | Lamons | G06Q 10/1095 |
| | | | 705/7.19 |
| 2016/0203444 A1* | 7/2016 | Frank | G06F 3/0484 |
| | | | 705/7.19 |
| 2016/0247123 A1* | 8/2016 | Holst | G06Q 10/1095 |
| 2016/0357464 A1 | 12/2016 | Suzuki et al. | |
| 2017/0086070 A1 | 3/2017 | Henderson et al. | |
| 2018/0189744 A1* | 7/2018 | Frank | G06Q 10/1095 |
| 2018/0276593 A1 | 9/2018 | Perret et al. | |
| 2018/0276621 A1 | 9/2018 | Madejczyk et al. | |
| 2018/0374093 A1 | 12/2018 | Baisnee | |
| 2019/0109834 A1 | 4/2019 | Lyons et al. | |

OTHER PUBLICATIONS https://www.youtube.com/watch?v=WOKHyuqeDF8 Geekie Mommie , Google Calendar for Families, 2015, Aug. 12, 2015.*
"Office : Create and share a public folder", https://support.office.com/en-us/article/Create-and-share-a-public-folder-A2835011-D524-4A5C-A207-05C159BB2A97, Sep. 29, 2016, 2 Pages.
Plaisant, et al. "Shared family calendars: Promoting symmetry and accessibility", In Journal of ACM Transactions on Computer-Human Interaction, vol. 13 Issue 3, Sep. 2006, pp. 313-346.
Pinola, Melanie, "Beyond Google Calendar and Apple Calendar: The 18 Best Apps to Manage Your Schedules", Retrieved From: https://web.archive.org/web/20170714210503/https://zapier.com/blog/best-calendar-apps/, Jun. 28, 2016, 22 pages.
"International Search Report and Written Opinion Issued in PCT Application No. PCT/US2018/023205", dated May 14, 2018, 12 Pages.
"Non Final Office Action Issued in U.S. Appl. No. 15/470,303", dated Jul. 8, 2019, 19 Pages.
"Final Office Action Issued in U.S. Appl. No. 15/470,303", dated Nov. 22, 2019, 24 Pages.
"Final Office Action Issued in U.S. Appl. No. 15/470,303", dated Dec. 9, 2019, 29 Pages.
"Non-Final Office Action Issued in U.S. Appl. No. 15/470,303", dated Apr. 16, 2020, 22 Pages.
"Office Action Issued in European Patent Application No. 18715457.0", dated Jul. 20, 2020, 7 Pages.
"Notice of Allowance Issued in U.S. Appl. No. 15/470,303", dated Nov. 2, 2020, 16.
Royer, et al., "Calendar Access Protocol (CAP)", Published in IP.com, IP.com No. IPCOM000132518D, Dec. 1, 2005, 132 Pages.
"Summons to Attend Oral Proceedings Issued in European Patent Application No. 18715457.0", dated May 10, 2021, 13 Pages.
"Summons to Attend Oral Proceedings Issued in European Patent Application No. 18715457.0", May 10, 2021, 13 Pages.
"Office Action Issued in Indian Patent Application No. 201947038667", dated Jan. 31, 2022, 6 Pages.

* cited by examiner

TECHNIQUES FOR SHARING ELECTRONIC CALENDARS BETWEEN MAILBOXES IN AN ONLINE APPLICATION AND COLLABORATION SERVICE

CROSS REFERENCE TO RELATED APPLICATIONS

This claims priority to and benefit from U.S. Provisional Patent Application Ser. No. 62/399,960, filed on Sep. 26, 2016, titled "Sharing Remote Calendars in Online Applications and Collaboration Service Environments," which is expressly incorporated by reference herein.

BACKGROUND

Mailboxes in online application and collaboration services such as, for example, Microsoft Office 365®, contain collections of folders. The collections of folders can include mail folders, calendar folders, folders for groups of contacts, etc. When an application syncs a mailbox, the application typically syncs content on a per folder basis. The calendars that a user creates are owned by the user and are stored in the user's mailbox as "local folders." However, the user can also have calendars that are shared, e.g., shared by another user or colleague. The shared calendars are local folders in the sharer's mailbox. When a sharee accepts a sharing invitation, a special entry is created in the sharee's mailbox. The entry just has a pointer to sharer's calendar in the sharer's mailbox. The entries are referred to as 'linked calendar entries.'

Unfortunately, only some clients, e.g., Desktop, Mac, Outlook Web Access (OWA), understand how to read these linked calendar entries. Consequently, when using a mobile device or any other mail application, a user may not be able to view shared calendars. Moreover, even on Desktop/Mac/OWA, the applications read from and write to someone else's mailbox. This process results in numerous reliability issues. For example, each client needs to implement its own client-specific business logic to implement features required for a shared calendar. Different client-specific business logic for each client often results in incomplete, inconsistent, or non-compliant mail application feature sets for shared calendars. For example, when a sharer shares a calendar with a sharee, the sharee gets a link to the sharer's calendar. A separate connection is then utilized to synchronize write changes made by the sharee back to the sharer's calendar. Consequently, local customizations on shared calendars are not possible.

Overall, the examples herein of some prior or related systems and their associated limitations are intended to be illustrative and not exclusive. Upon reading the following, other limitations of existing or prior systems will become apparent to those of skill in the art.

OVERVIEW

Examples discussed herein relate to sharing electronic cloud-based calendars via online application and collaboration services, e.g., Microsoft Office 365®. In an implementation, a method of operating an online application and collaboration service for sharing electronic calendars between mailboxes is disclosed. The method includes receiving a request to share a master calendar owned by a first user of the online application and collaboration service with a second user. The master calendar is stored in the first user's mailbox. The method further includes communicating a response indicating acceptance of the request to share the master calendar, generating a copy of the master calendar in the second user's mailbox, and synching the copy of the master calendar with the master calendar using pre-cached data to populate an initial view.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a computing device, or a computer readable medium.

Techniques are described herein for sharing electronic cloud-based calendars via online application and collaboration services, e.g., Microsoft® Office 365®. More specifically, techniques are described for sharing electronic cloud-based calendars by creating and maintaining local copies of the remote master calendars. In some implementations, the techniques describe syncing local folders (e.g., folders in a user's own mailbox) as opposed to using 'linked calendar entries' for calendars shared by another user. For example, when a sharer shares a calendar with a sharee, the sharee has its own synchronized copy of the master calendar, i.e., sharer's copy of the master calendar. Consequently, when the sharee makes an edit to a shared calendar, the edit is communicated to the sharee's mailbox where it can be intercepted, processed, and redirected to the master calendar. The edit may then be fanned out to other subscribers, e.g., additional sharees or subscribers of the master calendar.

Because the sharee has a synchronized copy of the master calendar in their own mailbox within the online application and collaboration service, clients associated with the sharee, e.g., desktop, mobile, etc., can directly read from, and directly write to, the synchronized copy of the calendar as opposed to using a link to read from and write to a remote 'master' calendar. This direct reading and writing allows devices, e.g., mobile devices running mail and calendaring applications, that are unable to decipher 'linked calendar entries,' to sync via direct reads and writes from the synchronized copy of the calendar in their own mailbox.

Additionally, the synchronized copy of the calendar allows sharees to add local customizations to events (or items) on the shared calendar. The local customization can include, but are not limited to, personal reminders, annotations, notes, offline support, etc. The customizations can be made to the sharee's copy (synchronized copy) of the calendar if the changes are specific to the sharee (e.g., reminders about an event on the calendar, notes about a meeting, etc.). That is, the local customizations are not synchronized with the master calendar as they are specific to the sharee. Nonetheless, the local customizations may be synchronized with other devices (or calendaring applications) associated with the sharee. For example, if the sharee wants an alert 15 minutes before a meeting or event on a shared master calendar, then the sharee can add the alert as a local customization on the local copy of the shared master calendar via one client (e.g., OWA) and receive the alert via another client (e.g., Outlook mobile app). Advantageously, clients (e.g., mail and calendar apps) no longer need to include business logic for establishing and maintaining shared calendars. Rather, the business logic is handled centrally by the online application and collaboration service.

In some embodiments, the 'linked calendar entries' may be maintained for compatibility with legacy clients. In such instances, the synced local folders (or calendars) may be marked as 'hidden' to the legacy clients so that the legacy clients do not attempt sync the folders and thereby show duplicate folders.

Among other benefits, the techniques discussed herein facilitate at least the following technical effects: bootstrapped initial views, email-based synching (both initial and periodic), remote (or local) write intercepting, and local customizations of shared calendars. Importantly, the techniques discussed herein facilitate mail and calendar client interaction with their own local mailbox. Thus, clients do not need to understand a lot of additional information for sharing calendars, e.g., which permissions the sharee may or may not have, etc. Moreover, when events (or items) in a shared calendar are updated, clients can now opt to receive user-specific notifications.

In some embodiments, local customizations are enabled by intercepting local writes. Among other features, e.g., simplifying the client-side, pushing the business logic to the service increases the speed at which the updates can be provided to a user and facilitates the local customizations. Additional features such as enhanced search are also made possible. For example, sharees can search shared calendars simply and easily because the search is now local. Previously, to reduce latency, a sharee would need to scope particular searches to particular folders, etc. Moreover, a user's 'free/busy' determination can now take into account or aggregate data from all of the user's calendars (both owned and shared).

Figure 1:
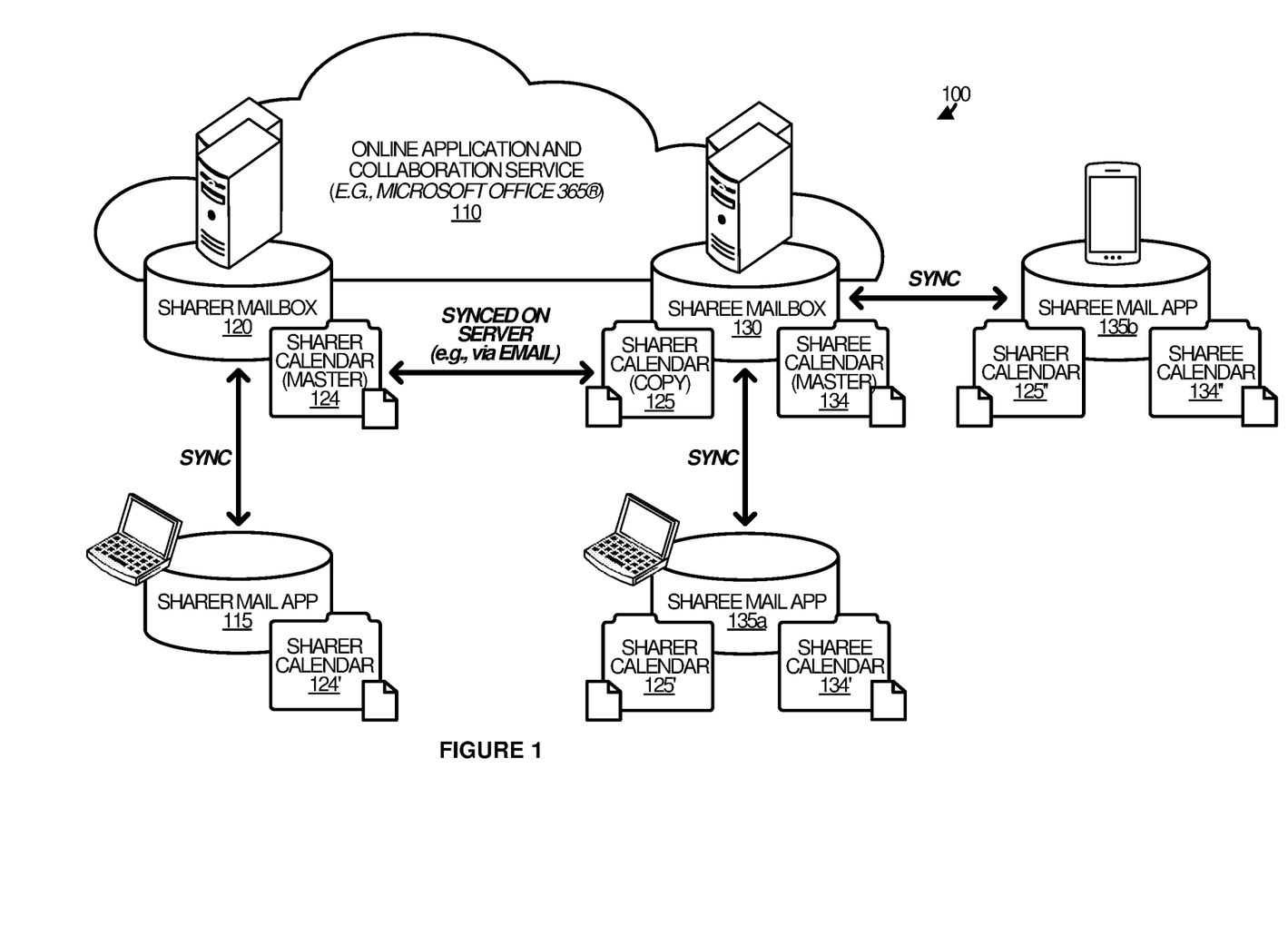
FIG. 1 depicts a block diagram illustrating an example operational architecture 100 for sharing a master calendar via an online application and collaboration service 110, according to some embodiments.
Figure 7:
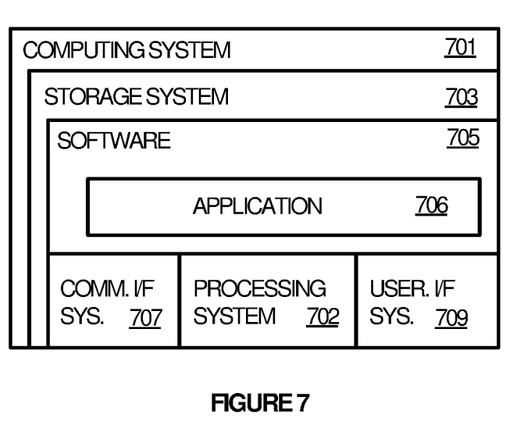
FIG. 7 is a block diagram illustrating a computing system suitable for implementing the electronic calendar sharing technology disclosed herein, including any of the applications, architectures, elements, processes, and operational scenarios and sequences illustrated in the Figures and discussed below in the Technical Disclosure.

FIG. 1 depicts a block diagram illustrating an example operational architecture 100 for sharing a master calendar via an online application and collaboration service 110, according to some embodiments. The example operational architecture 100 includes the online application and collaboration service 110 containing sharer mailbox (or mailbox service) 120 and sharee mailbox (or mailbox service) 130. The online application and collaboration service 110 is representative of any service providing cloud-based email and calendaring services such as, for example, Microsoft® Office 365®. The online application and collaboration service 110 may include server computers, blade servers, rack servers, and any other type of computing system (or collection thereof) suitable for carrying out the operations discussed herein. The online application and collaboration service 110 can include GUIs (graphical user interface) running on a PC, mobile phone device, a Web server, or even other application servers. Such systems may employ one or more virtual machines, containers, or any other type of virtual computing resource in the context of supporting enhanced group collaboration of which computing system 701 of FIG. 7 is representative.

As shown in the example of FIG. 1, the sharer mailbox 120 includes a sharer calendar (master) (or master calendar) 124 that is shared with a sharee. The online application and collaboration service 110 creates a local copy of the remote calendar, i.e., sharer calendar (copy) 125 in sharee mailbox 130 and syncs the calendars. For example, the mailboxes can be synced via email, e.g., control flow messages (CFMs), and/or a periodic synchronization that runs in the background. CFMs are discussed in greater detail in co-pending U.S. patent application Ser. No. 15/350,666, filed Nov. 14, 2016, the contents of which are expressly incorporated by reference herein. The example of FIG. 1 shows two client mail apps, i.e., sharee mail apps 135a (e.g., desktop) and 135b (e.g., mobile) that read and write from mailbox 130 to maintain two calendars, e.g., a local (or sharee) calendar 134 and a synchronized copy of the sharer calendar (e.g., sharer calendar (copy) 125). It is appreciated that mailbox 130 can include any number of local and shared (remote) calendars and any number of sharee mail apps.

In operation, sharer calendar (master) 124 is initially shared with one or more sharees. The request to share can be initiated by a sharer, for example, a user of sharer mail app 115. A sharee can accept or ignore a request to share a calendar. When a sharee accepts the calendar share request, an initial view sync component is activated. In some embodiments, the initial view sync component allows a quick initial sync of the most relevant or critical information of the shared calendar so that a local copy of the calendar can quickly be generated, e.g., sharer calendar (copy) 125. For example, the sharee may not want to wait for the full calendar to sync to view the calendar, so an initial portion of data (pre-cached data) deemed most relevant can be captured and transferred to the local copy. The most relevant data can be information that is needed to set up the sharing relationship as well as a subset of data, e.g., for a specific time range, that provides the sharee with an immediate view of the shared calendar, e.g., the subset of data can include just enough information for the sharee to be able to obtain and view information regarding an upcoming meeting (e.g., location, time, etc.).

The sharee mailbox (service) 130, or logic associated therewith, creates the synchronized copy of the sharer calendar, e.g., sharer calendar (copy) 125, with the initial information. A periodic sync then commences to synchronize the remaining information and maintain synchronization between the master and local copies of the shared calendars. At this point, the mail clients can read and write from the local copy, e.g., sharer calendar (copy) 125. The clients do not need to know that there is a remote (master) copy, e.g., sharer calendar (master) 124. The clients associated with the sharee, e.g., sharee mail app 135a and 135b, can synchronize their own local copies of the sharer calendar (copy) 125, e.g., sharer calendar 125' and 125", which can have full offline support. Reads of the calendar data from the client is generally straightforward because the data is present in a local mailbox, e.g., one or more folders of sharee mailbox 130.

If the sharee wants to make a change, e.g., a write request via through any protocols, like EAS, HxS, through OWA, EWS and REST, the online application and collaboration service 110 intercepts the write request. In the case of a local copy of a shared master calendar, the online application and collaboration service 110 knows that the sharee is working on a copy and the actual master is located in another mailbox. Accordingly, the online application and collaboration service 110 replays the write to the master and to the local copy. The write request can then be 'fanned out' to other sharees (or subscribers) using the same CFMs that are used to sync the calendars or other synchronization methodologies.

Figure 2:
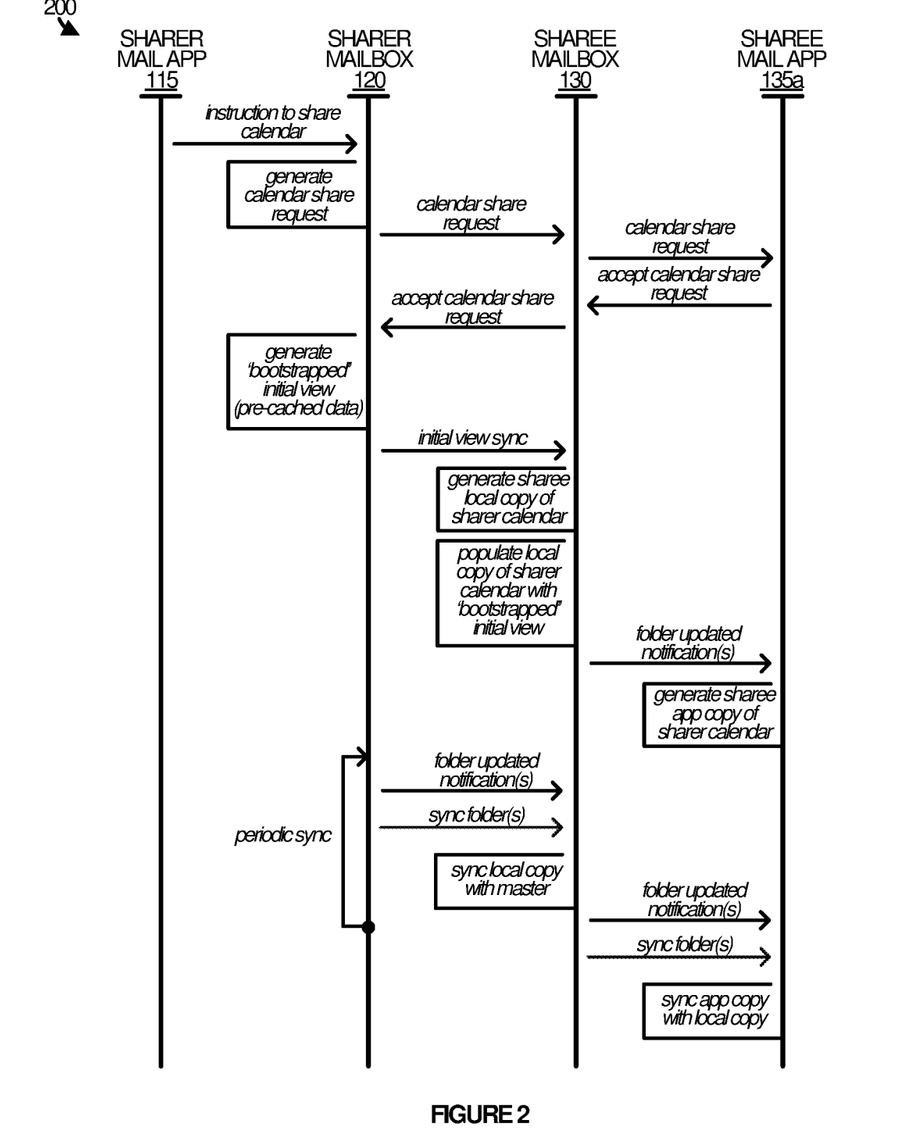
FIG. 2 depicts a sequence diagram illustrating example operations of the example operational architecture for sharing calendars via an online application and collaboration service, according to some embodiments.
Figure 3:
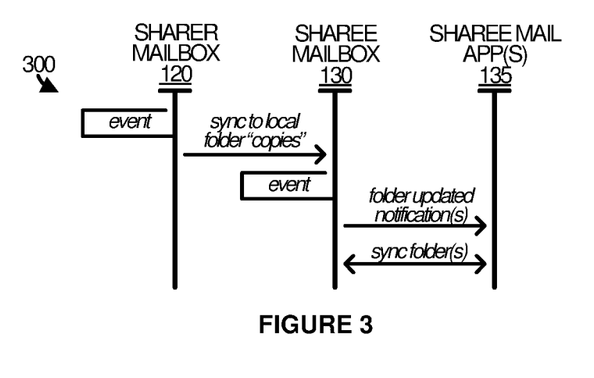
FIG. 3 depicts a sequence diagram illustrating operations of an example operational architecture for sharing calendars via an online application and collaboration service, according to some embodiments.
Figure 4:
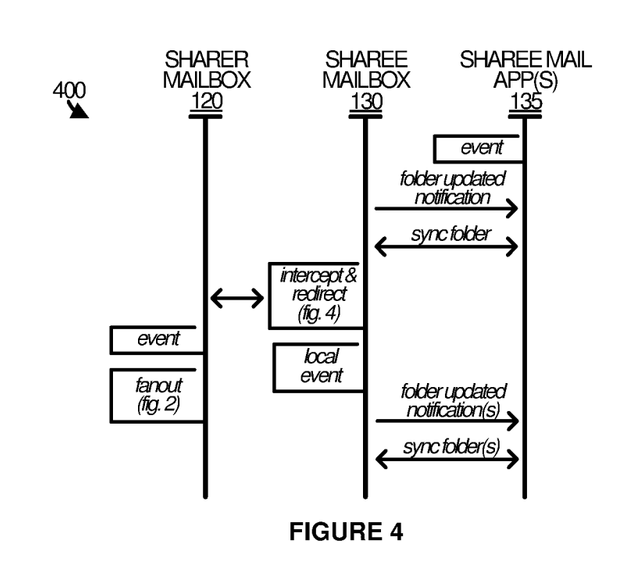
FIG. 4 depicts a flow diagram illustrating an example operational scenario for intercepting and redirecting a write request generated by a sharee mail application and directed to the sharee's mailbox, according to some embodiments.

To further illustrate the operation of example operational architecture 100, FIGS. 2-4 are provided. Referring first to FIG. 2, FIG. 2 depicts a sequence diagram 200 illustrating example operations of the example operational architecture 100 for sharing calendars via an online application and collaboration service, according to some embodiments.

More specifically, sequence diagram 200 illustrates example operations for generating, initially synching, and subsequently periodically synching a shared copy of a master calendar in a sharee mailbox using the techniques for synchronization discussed herein. Sequence diagram 200 includes operations of sharer calendar mail app 125, sharer mailbox 120, sharee mailbox 130, and sharee mail application 135a. Additional or fewer components of the example operation architecture 100 are possible.

To begin, a sharer (e.g., owner of sharer mailbox 120, not shown in FIG. 1) directs the service to share a calendar with a sharee. As shown in the example of FIG. 2, the request can be initiated in response to an instruction that is communicated from the sharer mail app 115 to the service (i.e., sharer mailbox service 120). The sharer mailbox 120, or business logic associated therewith, responsively generates the request to share the calendar. Because the request comes from the service, as opposed to a client, all requests within the service can be uniform. That is, because the service is generating and sending the invite, where previously it was often the client who crafted the invite, invites are consistent across the service.

The calendar share request is communicated to the sharee, e.g., via mail app 135a. The sharee accepts the request and communicates the acceptance back to the service. Initial data for sharing the calendar is then generated by or from the sharer mailbox 120. As discussed herein, the service can generate and provide a bootstrapped initial view with pre-cached data to the sharee mailbox 130. Responsive to receiving this initial view sync, the sharee mailbox 130, or business logic associated therewith, generates a copy of the master calendar, e.g., sharer calendar (copy) 125, in the second user's mailbox and synchronizes the copy of the master calendar with the master calendar using pre-cached data to populate a 'bootstrapped' initial view. The sharee mailbox (service) 130, or business logic associated therewith, then periodically synchronizes the copy of the master calendar with the master calendar, e.g., sharer calendar (master) 124, in sharer mailbox 120. Changes are also fanned out from the master calendar as discussed in more detail herein. Likewise, one or more sharee mail or calendaring apps, e.g., 135a or 135b periodically or otherwise synchronize with the copy of the master calendar. These synchronizations may be client-specific and/or otherwise determined by the specific sharee mail or calendaring apps.

FIGS. 3 and 4 illustrate example sequence diagrams 300 and 400, respectively. The example sequence diagrams 300 and 400 depict example operations of the example operational architecture 100 for sharing calendars via an online application and collaboration service, according to some embodiments. More specifically, the example of FIG. 3 illustrates an instance whereby an 'owner' or sharer of a calendar edits the calendar that is shared with one or more sharees and the event is distributed, 'fanned out', or otherwise synchronized with local copies of the shared calendar on other sharee mailboxes. Likewise, the example of FIG. 4 illustrates an instance whereby a sharee edits a local copy of the shared calendar, e.g., a copy of the master calendar located on or in the sharee's mailbox.

The sequence diagrams include operations of sharer mailbox 120, sharee mailbox 130, and one or more sharee mail apps 135 (e.g., 135a or 135b). Additional or fewer components of the example operation architecture 100 are possible.

Referring first to the example of FIG. 3, initially, an event is captured or modified. The sharer mailbox (or mailbox service) 120 identifies the event (change) and synchronizes with other local folder copies, e.g., sharer calendar (copy) 125 stored on sharee mailbox 130. The event (or change) can occur as a result of a sharer making a change to the sharer (master) calendar 124 or, alternately, as a result of a change that is synchronized from another sharee that is then being fanned out.

In some embodiments, the sharer mailbox 120 identifies there is a write, identifies any changed data, and then crafts one or more CFMs for the sharees or subscribers. The CFMs are essentially email messages that are hidden from the sharees. The CFMs are communicated to the sharees to sync the local folder copies on the sharee mailboxes. More specifically, the CFMs contain the information to update the sharee copy so that the copy stays in sync with the master calendar. Properties, like attachments, may not be included in the CFM messages due to the size of the files. Rather, the attachments can be synchronized via the periodic background sync on the mailbox. The background sync also provides eventual consistency as CFMs can be dropped or go missing. Once the event is updated at the sharee mailbox 130, the event can be read/written or pushed out to the sharee mail apps 135.

The example of FIG. 4 is similar to the example of FIG. 3, except that the sharee initiates the event (change or write request) on a local copy of the shared calendar. The event is synced to the sharee mailbox 130 where it is intercepted and redirected. For example, when a write is received at sharee mailbox 130 from a client, or any protocol, the service knows that the calendar item is for a shared calendar. Thus, the service intercepts the change, and, in some embodiments, splits the change into a local part and a remote part where the local part is a local customization and the remote part is the part that that is to be forward to the master (or original) calendar, e.g., shared (master) calendar 124. It is appreciated that the write could have a local part only, a remote part only, or both a local part and a remote part.

Although not shown, in the case of initial views, for read requests when a client does not have all of the information or data regarding an event yet, the service can intercept an attempted read request from the client where the read request is directed to an event on a shared calendar, notice that the calendar is not completely synchronized with the master calendar, and automatically go download (or fetch) the set of information that is requested.

The clients (sharee mail apps 135) sync and edit calendars. In this manner, everything is pushed out to the mailbox server, and clients know what they can or cannot sync. For example, a mobile phone app may not view categories on your calendar items and so when mobile device app synchs down items, the app does not sync categories. But the desktop app can sync categories. All updates are pushed to the mailbox servers and clients just typically know or understand what items or content they should synchronize.

Figure 5:
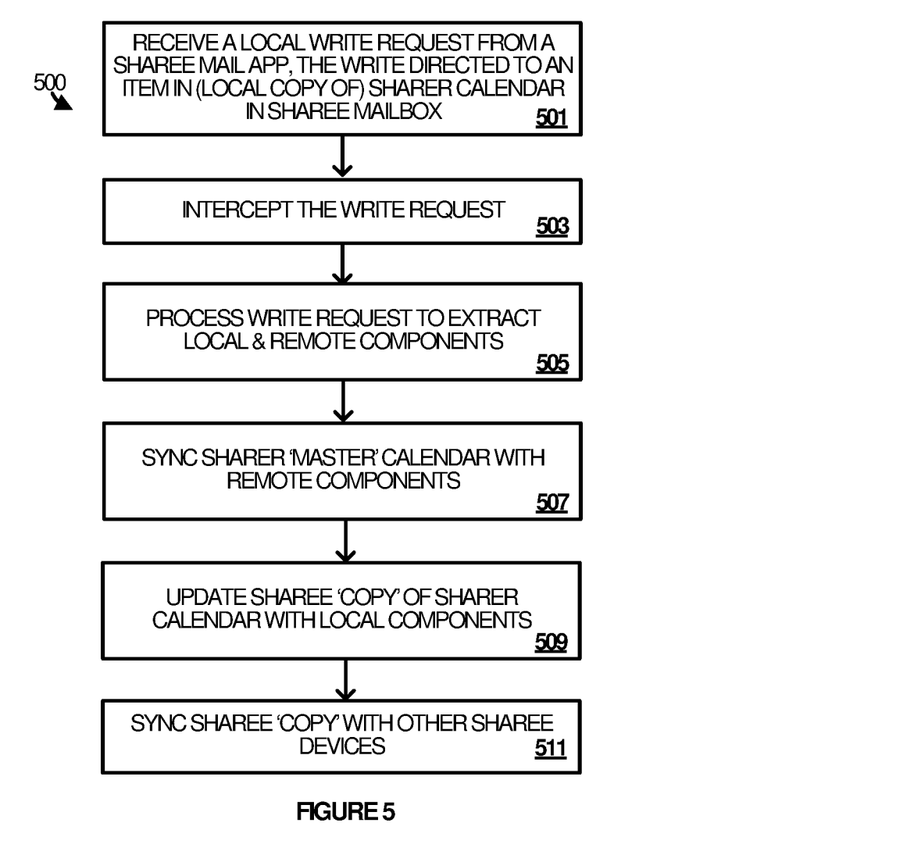
FIG. 5 depicts a flow diagram illustrating an example operational scenario for intercepting and redirecting a write request generated by a sharee mail application and directed to the sharee's mailbox, according to some embodiments.

FIG. 5 depicts a flow diagram illustrating an example operational scenario 500 for intercepting and redirecting a write request generated by a sharee mail application and directed to the sharee's mailbox, according to some embodiments. The example operational scenario 500 may be performed in various embodiments by an online application and collaboration service such as, for example, online application and collaboration service 110 of FIG. 1, or one or more processors, modules, engines, components or tools executing a sharee mailbox or calendaring service, e.g., sharee mailbox 130.

To begin, at 501, the sharee mailbox or calendaring service receives a write request from a sharee mail app directed to sharer calendar in sharee mailbox. At 503, the sharee mailbox or calendaring service intercepts the write request. At 505, the sharee mailbox or calendaring service processes the write request to extract local and remote components. As discussed herein, in some instances, the write may include only a local or only a remote component or part. At 507, the sharee mailbox or calendaring service synchronizes the master calendar with the remote components and, at 509, updates or synchronizes the local copy the local components. Lastly, at 511, the sharee mailbox or calendaring service synchronizes the local copy with other sharee mailboxes.

Figure 6:
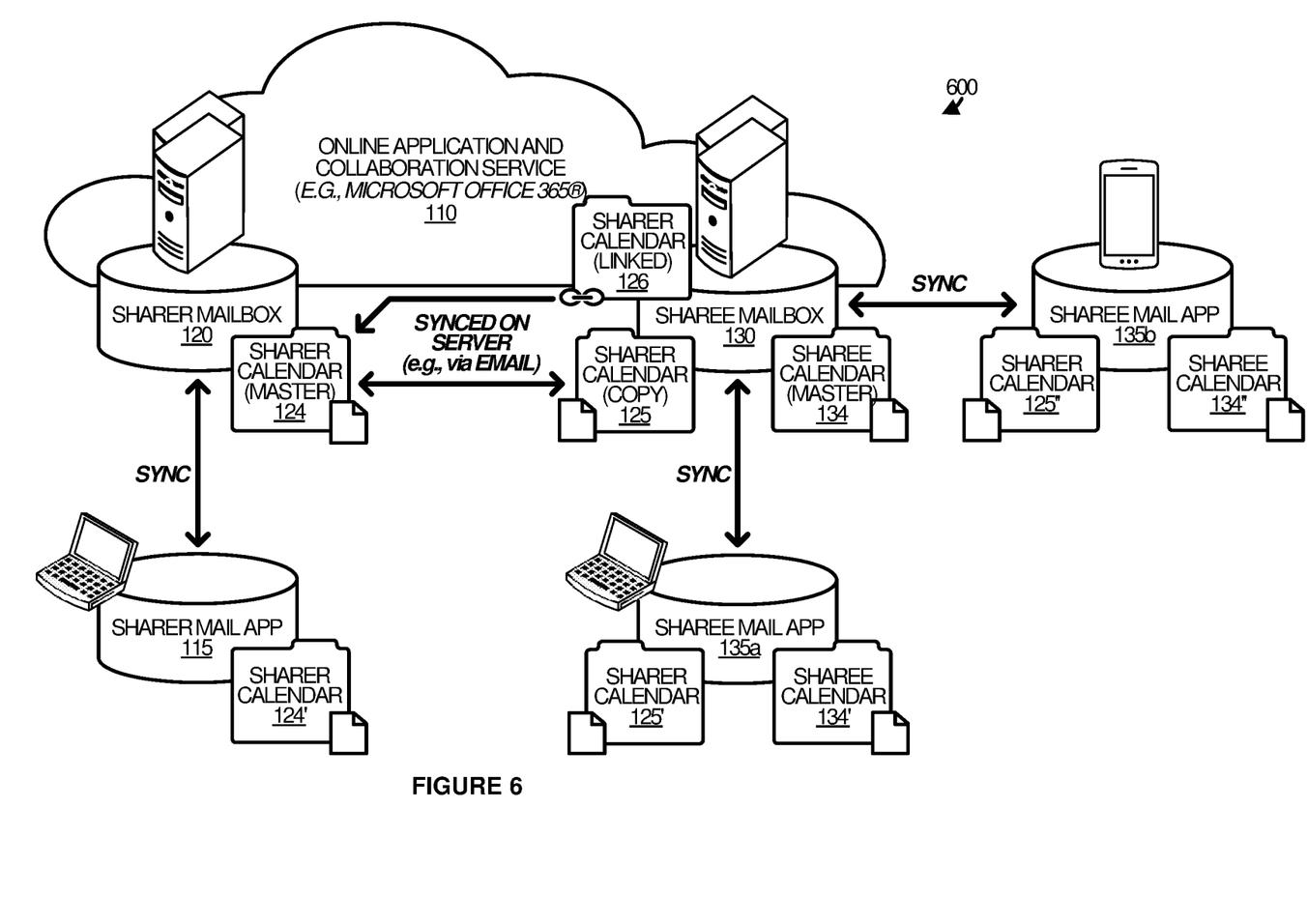
FIG. 6 depicts a block diagram illustrating an example operational architecture for sharing a master calendar via an online application and collaboration service, according to some embodiments.

FIG. 6 depicts a block diagram illustrating an example operational architecture 600 for sharing a master calendar via an online application and collaboration service 110, according to some embodiments. The example operational architecture 600 includes the online application and collaboration service 110 containing sharer mailbox 120 and sharee mailbox 130.

The example of FIG. 6 is similar to the example of FIG. 1, but the sharee mailbox 130 further includes sharee calendar (linked) 126, e.g., a 'linked calendar entry.' The sharee calendar (linked) 126 is maintained for compatibility with legacy clients. In this instance, the sharer calendar (copy) 125 is 'hidden' to the legacy clients so that the legacy clients do not attempt sync the folders and thereby show duplicate folders.

Like FIG. 1, the online application and collaboration service 110 is representative of any service providing cloud-based email and calendaring services such as, for example, Microsoft® Office 365®. The online application and collaboration service 110 may include server computers, blade servers, rack servers, and any other type of computing system (or collection thereof) suitable for carrying out the operations discussed herein. The online application and collaboration service 110 can include GUIs (graphical user interface) running on a PC, mobile phone device, a Web server, or even other application servers. Such systems may employ one or more virtual machines, containers, or any other type of virtual computing resource in the context of supporting enhanced group collaboration of which computing system 701 of FIG. 7 is representative.

FIG. 7 illustrates computing system 701, which is representative of any system or collection of systems in which the various applications, services, scenarios, and processes disclosed herein may be implemented. For example, computing system 701 may include server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709. Processing system 702 is operatively coupled with storage system 703, communication interface system 707, and an optional user interface system 709.

Processing system 702 loads and executes software 705 from storage system 703. When executed by processing system 702 for deployment of scope-based certificates in multi-tenant cloud-based content and collaboration environments, software 705 directs processing system 702 to operate as described herein for at least the various processes, operational scenarios, and sequences discussed in the foregoing implementations. Computing system 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device, but may also be distributed across multiple processing devices or sub-systems that cooperate in executing program instructions. Examples of processing system 702 include general purpose central processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data.

Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device, but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by processing system 702, direct processing system 702 to operate as described with respect to the various operational scenarios, sequences, and processes illustrated herein. For example, software 705 may include program instructions for directing the system to perform the processes described with reference to FIGS. 2-5.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtual machine software, or application software. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system. Indeed, encoding software on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 709 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 709. In some cases, the input and output devices may be combined in a single device, such as a display capable of displaying images and receiving touch gestures. The aforementioned user input and output devices are well known in the art and need not be discussed at length here. In some cases, the user interface system 709 may be omitted when the computing system 701 is implemented as one or more server computers such as, for example, blade servers, rack servers, or any other type of computing server system (or collection thereof).

User interface system 709 may also include associated user interface software executable by processing system 702 in support of the various user input and output devices discussed above. Separately or in conjunction with each other and other hardware and software elements, the user interface software and user interface devices may support a graphical user interface, a natural user interface, or any other type of user interface, in which a user interface to a productivity application may be presented.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of sharing electronic calendars between mailboxes in an online application and collaboration service, the method comprising:
   in response to an acceptance of a request to share a master calendar stored in a first mailbox associated with a sharer, generating and storing a sharee copy of the master calendar in a second mailbox associated with a sharee;
   synchronizing the master calendar with a local version of the master calendar stored with a local calendaring application on a first device associated with the sharer;
   synchronizing the sharee copy of the master calendar in the second mailbox with a local version of the sharee copy of the master calendar stored with a local calendaring application on a second device associated with the sharee; and
   synchronizing the master calendar in the first mailbox with the sharee copy of the master calendar in the second mailbox by at least:
      updating the sharee copy of the master calendar in the second mailbox based on changes made to the master calendar by the sharer via a first write request submitted by the local calendaring application on the first device to the master calendar in the first mailbox; and
      updating the master calendar in the first mailbox based on changes made to the sharee copy of the master calendar by the sharee via a second write request submitted by the local calendaring application on the second device to the sharee copy of the master calendar in the second mailbox;
   wherein updating the master calendar in the first mailbox based on the changes made to the sharee copy of the master calendar comprises:
      identifying a local part and a remote part of the changes made to the sharee copy of the master calendar;
      updating the master calendar in the first mailbox with the remote part of the changes made to the sharee copy of the master calendar; and
      refraining from updating the master calendar in the first mailbox with the local part of the changes made to the sharee copy of the master calendar.

2. The method of claim 1, further comprising implementing, based on the remote part of the changes made to the sharee copy of the master calendar, a global calendar synchronization.

3. The method of claim 1, further comprising:
   performing periodic sync operations to maintain synchronization between the sharee copy of the master calendar and the master calendar.

4. The method of claim 3, wherein at least one of the periodic sync operations comprises an email-based communication.

5. The method of claim 4, wherein the email-based communication comprises a control flow message.

6. The method of claim 1, further comprising:
   receiving pre-cached data from the first mailbox; and
   populating an initial view of the sharee copy of the master calendar with the pre-cached data.

7. The method of claim 1, further comprising:
   synchronizing the sharee copy of the master calendar in the second mailbox with a local version of the sharee copy of the master calendar stored with a local calendaring application on a third device associated with the sharee;
   wherein the local calendaring application on the third device comprises a first logic and the local calendaring application on the second device comprises a second logic distinguished from the first logic.

8. An apparatus comprising:
   one or more computer readable storage media; and
   program instructions stored on the one or more computer readable storage media operable to share electronic calendars between mailboxes in an online application and collaboration service that, when executed by a processing system, direct the processing system to at least:
      in response to an acceptance of a request to share a master calendar stored in a first mailbox associated with a sharer, generate and store a sharee copy of the master calendar in a second mailbox associated with a sharee;
      synchronize the master calendar with a local version of the master calendar stored with a local calendaring application on a first device associated with the sharer;
      synchronize the sharee copy of the master calendar in the second mailbox with a local version of the sharee copy of the master calendar stored with a local calendaring application on a second device associated with the sharee; and
      synchronize the master calendar in the first mailbox with the sharee copy of the master calendar in the second mailbox by at least:
      updating the sharee copy of the master calendar in the second mailbox based on changes made to the master calendar by the sharer via a first write request submitted by the local calendaring application on the first device to the master calendar in the first mailbox; and
      updating the master calendar in the first mailbox based on changes made to the sharee copy of the master calendar by the sharee via a second write request submitted by the local calendaring application on the second device to the sharee copy of the master calendar in the second mailbox;
      wherein updating the master calendar in the first mailbox based on the changes made to the sharee copy of the master calendar comprises:
      identifying a local part and a remote part of the changes made to the sharee copy of the master calendar;
      updating the master calendar in the first mailbox with the remote part of the changes made to the sharee copy of the master calendar; and refraining from updating the master calendar in the first mailbox with the local part of the changes made to the sharee copy of the master calendar.

9. The apparatus of claim 8, wherein the program instructions, when executed by the processing system, further direct the processing system to implement, based on the remote part of the changes made to the sharee copy of the master calendar, a global calendar synchronization.

10. The apparatus of claim 8, wherein the program instructions, when executed by the processing system, further direct the processing system to:
perform an initial sync operation by synchronizing the sharee copy with at least a portion of the master calendar;
perform periodic sync operations to maintain synchronization between the sharee copy and the master calendar; and
perform an application sync operation to synchronize the sharee copy with the local sharee copy of the master calendar.

11. The apparatus of claim 10, wherein the initial sync operation or at least one of the periodic sync operations comprises an email-based communication.

12. The apparatus of claim 11, wherein the email-based communication comprises a control flow message.

13. The apparatus of claim 8, wherein the program instructions, when executed by the processing system, further direct the processing system to:
receive pre-cached data from the first mailbox; and
populate an initial view of the sharee copy of the master calendar using the pre-cached data.

14. The apparatus of claim 8, wherein the program instructions, when executed by the processing system, further direct the processing system to:
synchronize the sharee copy of the master calendar in the second mailbox with a local version of the sharee copy of the master calendar stored with a local calendaring application on a third device associated with the sharee;
wherein the local calendaring application on the third device comprises a first logic and the local calendaring application on the second device comprises a second logic distinguished from the first logic.

15. An online application and collaboration service comprising:
one or more processing systems;
one or more computer readable storage media having program instructions stored thereon which, when executed by a one or more processors, direct the one or more processors to at least:
responsive to an acceptance of a request to share a master calendar stored in a first mailbox associated with a sharer, generate and store a sharee copy of the master calendar in a second mailbox associated with a sharee;
synchronize the master calendar with a local version of the master calendar stored with a local calendaring application on a first device associated with the sharer;
synchronize the sharee copy of the master calendar in the second mailbox with a local version of the sharee copy of the master calendar stored with a local calendaring application on a second device associated with the sharee; and
synchronize the master calendar in the first mailbox with the sharee copy of the master calendar in the second mailbox by at least:
updating the sharee copy of the master calendar in the second mailbox based on changes made to the master calendar by the sharer via a first write request submitted by the local calendaring application on the first device to the master calendar in the first mailbox; and
updating the master calendar in the first mailbox based on changes made to the sharee copy of the master calendar by the sharee via a second write request submitted by the local calendaring application on the second device to the sharee copy of the master calendar in the second mailbox;
wherein updating the master calendar in the first mailbox based on the changes made to the sharee copy of the master calendar comprises:
identifying a local part and a remote part of the changes made to the sharee copy of the master calendar;
updating the master calendar in the first mailbox with the remote part of the changes made to the sharee copy of the master calendar; and
refraining from updating the master calendar in the first mailbox with the local part of the changes made to the sharee copy of the master calendar.

16. The online application and collaboration service of claim 15, wherein the program instructions, when executed by the one or more processors, further direct the one or more processors to:
perform an initial sync operation by synchronizing the sharee copy with at least a portion of the master calendar using pre-cached data to populate an initial view;
perform periodic sync operations to maintain synchronization between the sharee copy and the master calendar; and
perform an application sync operation to synchronize the sharee copy with the local sharee copy of the master calendar.

17. The online application and collaboration service of claim 16, wherein the initial sync operation or at least one of the periodic sync operations comprises an email-based communication.

18. The online application and collaboration service of claim 17, wherein the email-based communication comprises a control flow message.

19. The online application and collaboration service of claim 15, wherein the program instructions, when executed by the one or more processors, further direct the one or more processors to implement, based on the remote part of the changes made to the sharee copy of the master calendar, a global calendar synchronization.

20. The online application and collaboration service of claim 15, wherein the program instructions, when executed by the one or more processors, further direct the one or more processors to:
synchronize the sharee copy of the master calendar in the second mailbox with a local version of the sharee copy of the master calendar stored with a local calendaring application on a third device associated with the sharee;
wherein the local calendaring application on the third device comprises a first logic and the local calendaring application on the second device comprises a second logic distinguished from the first logic.

* * * * *